UNITED STATES PATENT OFFICE.

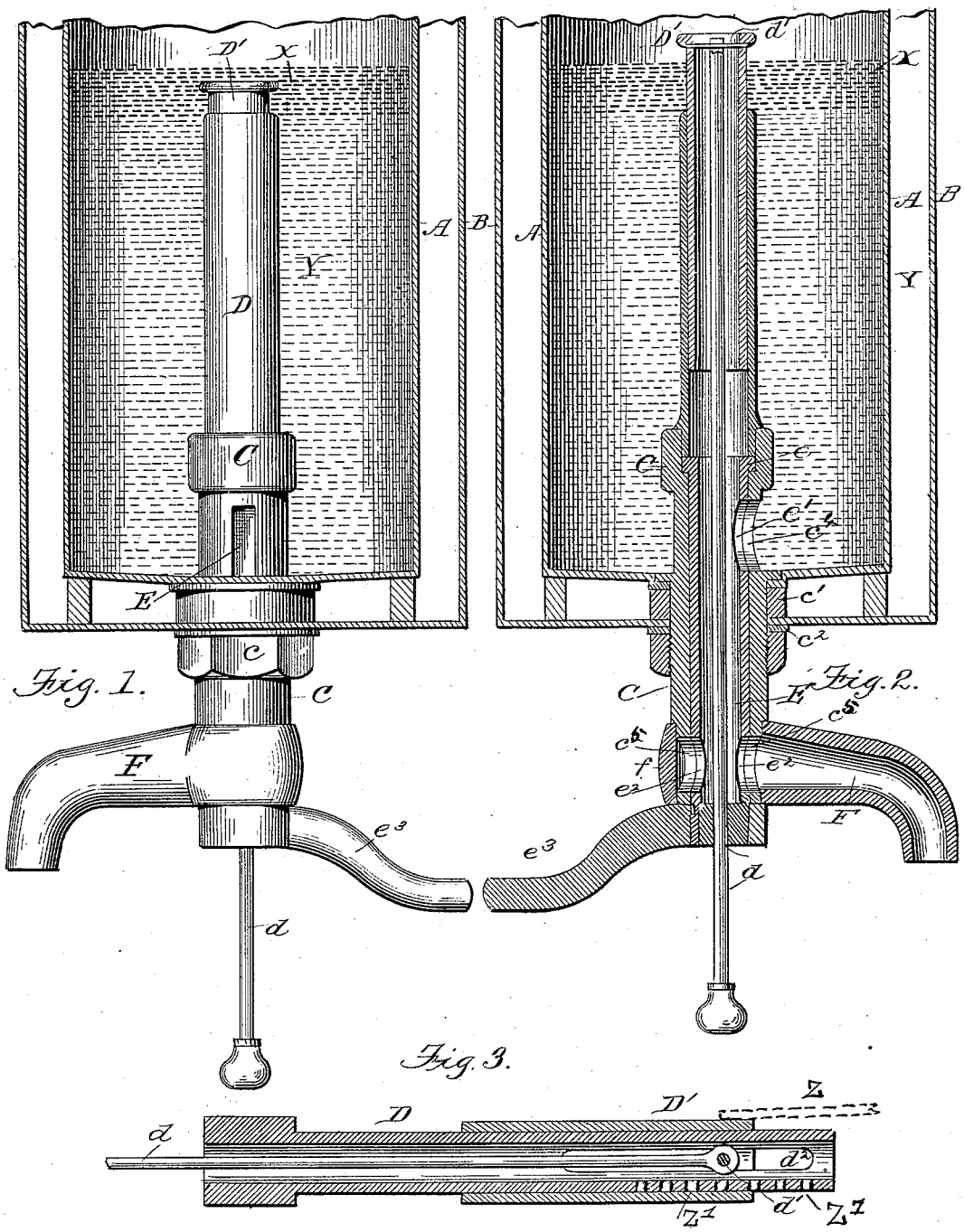

FREDRICK W. MOSELEY, OF POULTNEY, VERMONT.

COMPOUND FAUCET.

SPECIFICATION forming part of Letters Patent No. 306,171, dated October 7, 1884.

Application filed February 16, 1884. (No model.)

*To all whom it may concern:*

Be it known that I, FREDRICK W. MOSELEY, a citizen of the United States, residing at Poultney, in the county of Rutland and State of Vermont, have invented certain new and useful Improvements in Compound Faucets, of which the following is a specification, reference being had therein to the accompanying drawings.

The object of my invention in this case is to provide means whereby liquids of different specific gravity may be withdrawn from a vessel or vessels independently of each other and at will, and may be delivered into different receiving-vessels, as desired, and although hereinafter described in connection with a separation of milk and cream from each other for the purpose of clearly setting forth my invention and its operation, I do not limit myself to such a use of the same, as it is applicable to any art or arts wherein it is desired to separate liquids of the character above mentioned, or liquids and solids or sediments therein.

Certain novel features of construction herein shown and described are not herein claimed, as they are made the subjects-matter of companion applications pending herewith, and designated as Cases A, B and C. In the separation of liquids and substances therein, as above stated, there are required means for the withdrawal of an upper and a lower stratum within a vessel. In addition to such means, in the present instance I have provided means for the final disposition of the separate substances at will into separate vessels.

Referring to the drawings, Figure 1 is a side elevation of a compound faucet constructed in accordance with my invention, represented as connected to a jacketed vessel, shown in section, and with the principal elements of the faucet arranged for withdrawing the upper stratum. Fig. 2 is a central vertical section with the principal elements of the faucet arranged for withdrawing liquid from the lower stratum. Fig. 3 is a modification in section.

Like letters of reference indicate like parts in all the figures.

A represents any suitable can or vessel, arranged within a jacket or a second vessel, B. C represents what is hereinafter designated as a "discharge-tube," which passes through the bottoms of both vessels, and is secured thereto, it may be, in any suitable manner—in this instance by means of a nut, $c$, mounted upon the tube. As usual in jacketed vessels, a spacing block or packing, $c'$, encircles the discharge-tube between the bottoms, and any suitable packing, as $c^2$, is inserted between the nut and the bottom of the lower can, whereby the parts may be bound firmly together against leakage. Suitably connected to the upper end of the discharge-tube, and arranged in line therewith in this instance, is a surface-drainage tube, D, having a telescopic section, D'. Within the discharge-tube is a discharge-nozzle, E, having at its upper end a flange, $e$, seated in the upper end of the discharge-tube, and having near its upper end a port, $e'$, arranged so that it may be brought into communication with a port, $c^4$, in the discharge-tube, located within the bottom and closely to the bottom of the vessel A. The lower end of the discharge-nozzle is provided with two ports, $e^2$, arranged opposite each other, so as to be made to register with two similarly-arranged ports, $c^5$, in the discharge-tube. The extreme lower end of the discharge-nozzle is closed, except at its center, where it is perforated for the passage of a rod, $d$, which is connected to the section D', it may be, in any suitable manner, but in this instance to a cross bar or rod, $d'$, in the upper end of the section D' of the surface-drainage pipe. The lower end of the discharge-nozzle is provided with an operating-handle, $e^3$, whereby said nozzle may be rotated within the discharge-tube. At the lower end of the discharge-tube and mounted thereon is a suitable stop-cock nozzle, F, the inner end, $f$, of which completely embraces the discharge-tube, so that when rotated thereon the passage of the stop-cock nozzle may be brought to a point on the discharge-tube where there is no port, and in this manner prevent the final discharge of liquids therefrom, and so as to permit of the arrangement of said passage so as to communicate with either of the ports $c^5$ at either side of said discharge-tube, so that liquids may be discharged from said tube at either side, for the purpose hereinafter stated.

In Fig. 3 the surface-drainage pipe D is longitudinally slotted at opposite sides, as at $d^2$, and the telescopic extension D′ is arranged outside of the pipe in the form of a sleeve. The cross bar or rod $d'$ passes through the slot $d^2$ and into opposite sides of the sleeve or extension D′, and to this rod $d'$ the rod $d$ is connected. Now it will be observed that with the lighter liquid X and the heavier liquid Y in the vessel A, either may be withdrawn from the vessel independently of and without agitation in the other at will. By withdrawing the rod $d$ the extension D′ of the surface-drainage pipe is brought below the surface of the lighter liquid, when it passes through said extension into the discharge-nozzle E, which being rotated by means of the handle $e^3$, so that the port $e'$ does not register with the port $c^4$ of the discharge-tube, and so that its port $e^2$ does register with the port $e^5$ of the discharge-tube, the said lighter liquid may, by turning the stop-cock nozzle F to the left, as shown in Fig. 1, be discharged into any suitable vessel. By turning said stop-cock nozzle, as it were, directly to the front, as in Fig. 1, it performs the function which its name indicates—namely, that of a stop-cock—and prevents the escape of said lighter liquid through the ports described. In this manner a lighter liquid may be withdrawn intermediately or continuously, as desired. By changing the position of the stop-cock nozzle to the right, as shown in Fig. 2, the lighter liquid may be delivered at that point, so that when it is desired to deliver either liquids within the vessel into separate vessels or conductors, such a manipulation of the stop-cock nozzle will accomplish the purpose in view. By simply raising the rod $d$, so that the extension D′ of the surface-drainage pipe is elevated above the lighter liquid, and by turning the handle $e^3$ of the discharge-nozzle E, so that its port $e'$ shall register with the port $c^4$ of the discharge-tube, the heavier liquid in the vessel may be withdrawn at will continuously or intermittently, and delivered into different vessels or troughs, as above stated, by manipulating the stop-cock nozzle F, as described. Now it will be observed that I may secure some of the desired results, as an independent withdrawal of the lighter and heavier liquids, without the use of the stop-cock nozzle F, as when the extension D′ of the surface-drainage pipe is elevated, as shown in Fig. 2, I may turn the discharge-nozzle E, so that its port $e'$ shall not register with the port $c^4$ of the discharge-tube, and neither liquid can escape from the vessel. This feature is shown in the companion cases above referred to, and is not herein broadly claimed.

Considering the heavier liquid Y as milk and the lighter liquid X as cream, it is apparent that my compound faucet herein disclosed is capable of advantageous use in connection with cream-raising, as practiced in accordance with any well-known theory; but when connected with a can completely jacketed, as shown in this instance, but to which particular use I do not in any sense limit my invention, the cold deep setting or Swedish method of raising cream can readily be practiced, and such method or any other may be availed, not only in dairies, but in restaurants, hotels, milk-depots, and any other establishments where milk and cream are dispensed in small quantities, or where milk is set and cream is raised and it is desired to make a final separation.

I do not wish to be understood as limiting my invention, as hereinafter specifically set forth in the claims, to a use thereof in connection with a process of raising cream and separating the same from milk, but may apply it to any of the arts mentioned; nor do I confine myself to the construction herein shown so far as regards the specific means—the rod $d$—for manipulating the surface-discharge pipe. So, also, in other respects and in the particular manner of construction, I may vary the same to any extent and in any manner which will suggest themselves to persons skilled in the art of constructing similar devices.

By arranging the extension D′ on the outside of the surface-drainage pipe D as a sleeve, whether said extension be operated by a rod internally arranged or externally arranged, as at Z, Fig. 3, or by hand, to depress said extension or sleeve below the upper surface of the lighter liquid, I am enabled to avail myself of the entire capacity of the discharge-pipe as an outlet; whereas when the rod $d$ or extension D′ is arranged inside of said pipe it is with a sacrifice of a portion of its capacity, and I therefore do not limit myself to an internal arrangement of said extension and rod; and when I discard the means herein shown—namely, the rod and cross-bar—for operating said extension, I also may omit, especially with an external arrangement of the extension or sleeve, the slot or slots $d^2$ in the discharge-pipe; but as a slot or slots or a series of holes, Z′, Fig. 3, similarly located act as ports through which the lighter liquid may enter the pipe when the sleeve is depressed below them, I may retain them even if I do discard the rod and cross-bar.

Having described my invention and its operation, what I claim is—

1. In a compound faucet, the combination of a discharge-tube, a surface-drainage pipe arranged in line therewith, and a discharge-nozzle similarly arranged, with a stop-cock nozzle arranged to rotate upon the discharge-tube, substantially as specified.

2. A surface-discharge pipe slotted as described, and provided with an enveloping sleeve, and means arranged within the pipe for raising and lowering the sleeve, substantially as specified.

3. The combination of the vessel A, the discharge-tube C, passing through the bottom of the same, and having a port, $c^4$, a discharge-nozzle, E, arranged therein, and having a port, $e'$, with a surface-drainage pipe, as D D′, and with a stop-cock nozzle mounted upon the discharge-tube to rotate thereon, and means for rotating the discharge-nozzle, substantially as shown and described.

4. The combination of a slotted surface-drainage pipe and a sleeve with a discharge-pipe arranged in line with the surface-drainage pipe, substantially as specified.

5. The combination of the jacketed vessel A, the discharge-tube C, passing through the bottoms of both the vessel and of the jacket, the discharge-nozzle E, arranged within the discharge-tube, the surface-drainage pipe D D', arranged in line with the discharge-tube, and means for raising and lowering the pipe and for rotating the discharge-nozzle, substantially as specified.

In testimony whereof I affix my signature in presence of two witnesses.

FREDRICK W. MOSELEY.

Witnesses:
E. B. STOCKING,
WM. S. DUVALL.